United States Patent [19]

Goldman

[11] 4,308,902
[45] Jan. 5, 1982

[54] DUPLICATING APPARATUS WITH VARIABLE SCALE FACTOR

[76] Inventor: Jeffrey H. Goldman, 41 Pine Brook La., West Hartford, Conn. 06107

[21] Appl. No.: 122,013

[22] Filed: Feb. 19, 1980

[51] Int. Cl.³ .......................... B27C 5/10; B23B 5/46
[52] U.S. Cl. .......................................... 142/7; 142/26; 144/144 R; 409/67; 409/69; 409/104
[58] Field of Search ................ 142/7, 15, 26; 409/92, 409/104, 91, 67, 68, 69, 70; 144/137, 144 R, 144 D, 154, 323, 150

[56] References Cited

U.S. PATENT DOCUMENTS

| | | | |
|---|---|---|---|
| 1,859,474 | 5/1932 | Shawver | 142/15 |
| 2,594,694 | 4/1952 | Smith | 409/92 |
| 3,739,824 | 6/1973 | Hoenig | 144/144 R |
| 3,946,774 | 3/1976 | McCord, Jr. | 144/136 R |
| 4,000,766 | 1/1977 | Surcliffe | 144/144 R |
| 4,248,282 | 2/1981 | Waldron et al. | 144/144 R |

*Primary Examiner*—W. D. Bray
*Attorney, Agent, or Firm*—Robert S. Smith

[57] ABSTRACT

Apparatus for duplicating a master object includes a router which is positioned on a pivoting carriage which has a follower which engages a rotating three dimensional master object. The work piece is rotated at the same rate as the master object and a router carried on the carriage engages the work piece. The location of the axis about which the master object rotates may be varied to change the scale factor so that the work piece may be smaller than the master object.

3 Claims, 3 Drawing Figures

DUPLICATING APPARATUS WITH VARIABLE SCALE FACTOR

BACKGROUND OF THE INVENTION

The invention relates to power tools and specifically to duplicating apparatus utilizing a router for producing a work piece which has a geometric shape which is the same as or smaller than a master object. The prior art includes apparatus which is sold commercially by Sears, Roebuck and Company, Chicago, Ill. Such apparatus is identified as a "router crafter". This apparatus is capable of cooperating with a two dimensional master object to produce a three dimensional work piece. A disadvantage of this apparatus is that the possible geometric shapes of the work piece are severely limited. Another difficulty with such apparatus is that the apparatus which is presently available does not permit variation in the scale between the master object and the work piece.

It is an object of the invention to provide apparatus which will generate very complex geometric forms such as the "Queen Anne's" furniture legs.

It is another object of the invention to provide such apparatus which will be simple and inexpensive to construct.

Another object of the invention is to provide apparatus which may be added to existing apparatus in a rapid and simple manner.

Still another object of the invention is to provide apparatus which will be safe to operate.

Yet another object of the invention is to provide apparatus which will allow for easy variation in a scale factor between a master object and a work piece.

SUMMARY OF THE INVENTION

It has now been found that these and other objects of the invention may be attained in an apparatus for duplicating a master object which comprises a frame, means cooperating with the frame for holding an associated work piece and rotating the work piece about a first axis, and means cooperating with the frame for holding an associated master object and rotating the master object about a second axis. A follower is carried on the pivoting member in spaced relationship from the third axis and the follower engages the associated master object and pivots the pivoting member responsive to the contours of the master object. A router is also carried on the pivoting member in spaced relationship from both the follower and the third axis. Means are provided for mounting the follower to allow translating motion along a path which is generally parallel to the first axis. Means are provided for varying the distance between the second axis and the path. Means are also provided for rotating the master object and the work piece.

In one form of the invention the means for varying the distance between the path and the second axis comprises a pair of elongated slots in the frame. A means for rotating the master object and the work piece may include an elastic belt.

BRIEF DESCRIPTION OF THE DRAWING

The invention will be better understood by reference to the accompanying drawing in which.

DESCRIPTION OF A PREFERRED EMBODIMENT

Figure 1:
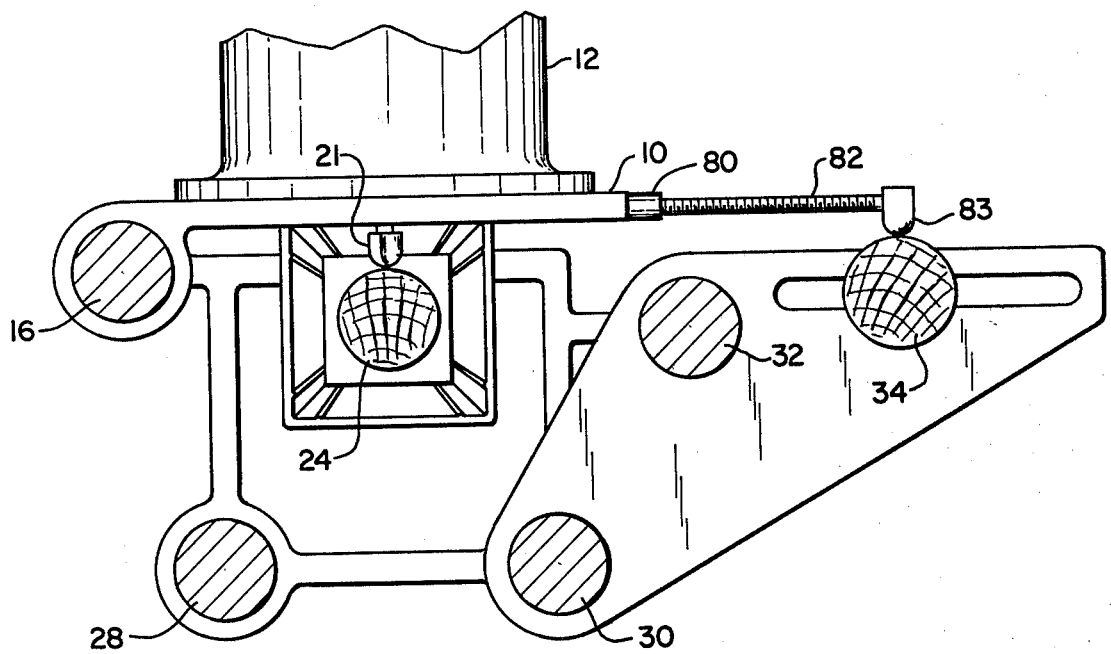
FIG. 1 is a simplified partially schematic side elevational view of the apparatus in accordance with one form of the invention.
Figure 2:
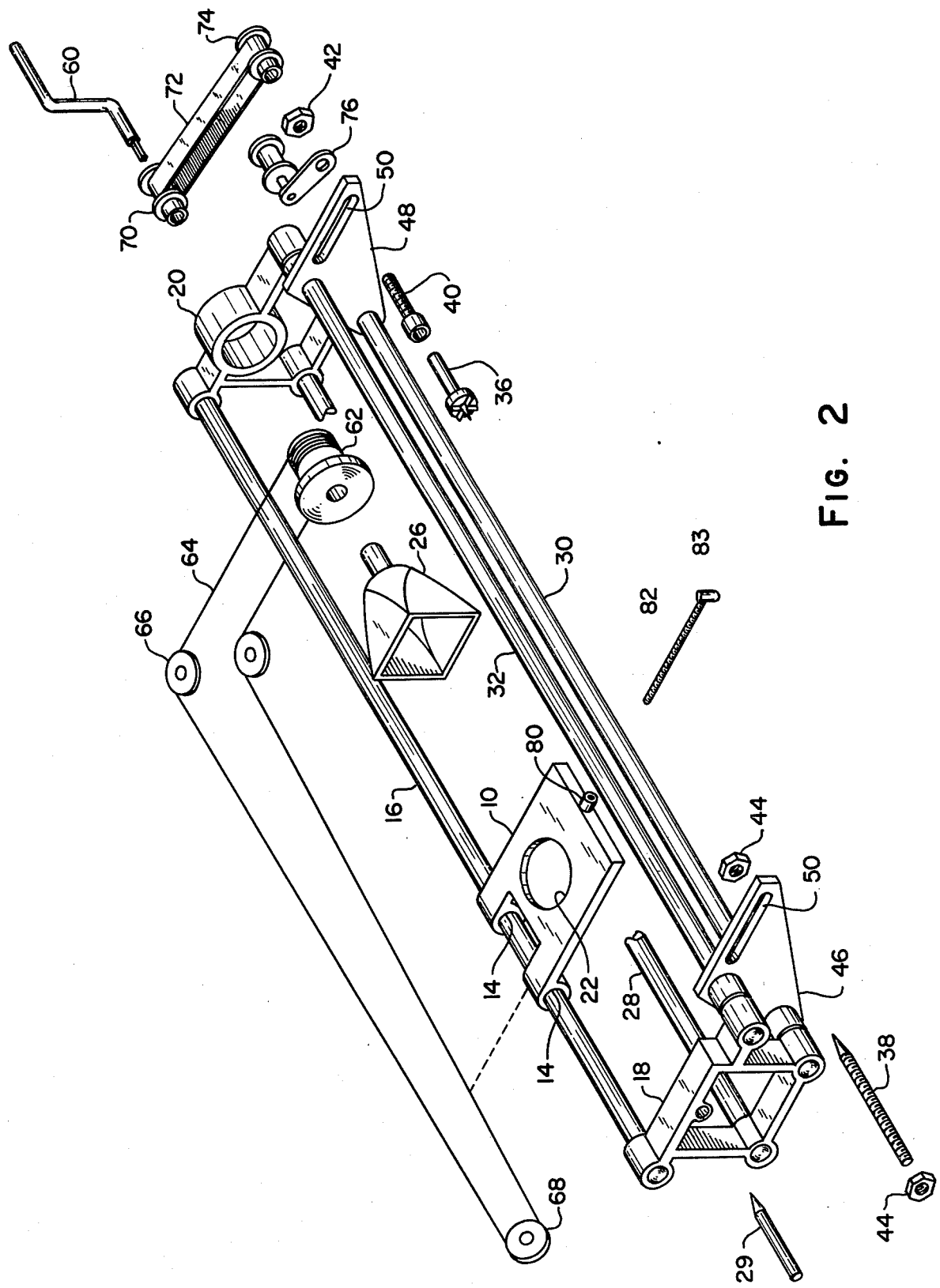
FIG. 2 is a simplified partially schematic exploded perspective view of the apparatus shown in FIG. 1.

Referring now to FIGS. 1 and 2 there is shown a pivot member 10 on which is carried a router 12. The pivot member 10 includes journal bearings 14 which cooperate with a bar 16 which is carried by end frames 18 and 20. The router 12 includes a blade 21 which extends through a hole 22 in the pivot member 10. The blade 21 cooperates with a work piece 24 which is carried by drive spindle 26 and spindle 29. The end frames 18 and 20 are rigidly connected together by bars 16, 28, 30, and 32. A master object 34 which ordinarily will have three dimensional characteristics to utilize the full capabilities of the apparatus in accordance with the invention is carried between spindle 36 and spindle 38. The spindle 36 is mounted by means of bushing 40 and nut 42. Similarly the spindle 38 is mounted with nuts 44, 44. These spindles are respectively carried on mounting members 46, 48 which each have an elongated slot 50 for carrying the respective spindles. Each mounting member 46, 48 has bores cooperating with bars 32 and 30.

The mounting for drive spindle 26 includes a handle 60 which cooperates with a drive member 62 which is carried for rotation in end frame 20. The drive member 62 is provided with a cable 64 which encircles the drive member 62 and which also passes over pulleys 66, 68. Rotation of the handle 60 will cause the pivoting member 10 (which may be connected thereto) to translate along the bar 16 so that essentially the entire axial extent of the work piece 24 may be cut by the blade 21 if a clutch mechanism (not shown) in drive member 62 is engaged. Ordinarily the pivoting member 10 will be translated by a force applied directly to the router 12 on pivoting member 10. Rotation of handle 60 will rotate the drive spindle 26 to cause the work piece to rotate. In a similar manner the rotation of the handle 60 will cause the pulley 70 to rotate. Cooperating with the pulley 70 is a belt 72 which also cooperates with a pulley 74 mounted on the spindle 36. Accordingly rotation of the handle 60 also rotates the master object by means of the spindle 36. A belt tensioning member 76 is secured in place by means of nut 42 to insure that adequate tension is maintained on belt 72 so that there is a positive drive between pulleys 70 and 74.

In some forms of the invention the belt tensioning member will be eliminated and belt 72 will be elastic.

In operation the user may vary the position of the spindles 36, 38 within the slots 50, 50 so that the scale factor may be varied. Telescoping arms 80, 82 are carried on the pivoting member 10 to provide a following action with respect to the master object carried between spindles 38 and 36. Element 83 on arm 82 may have contours similar to the contours of the blade 21. The arm 82 may be connected to arm 80 by means of nuts (not shown) at each axial extremity of arm 80. This arrangement allows variation in the total length of arms 80 and 82. Rotation of handle 60 as will be seen from the above accordingly simultaneously produces rotation of the work piece and the master object and translation of the pivoting member 10 on which the router 12 is carried.

Figure 3:
FIG. 3 is an elevational view of a "Queen Anne's" leg manufactured by the apparatus in accordance with the invention.

It will thus be seen that the apparatus in accordance with the invention may be used to manufacture very complex geometric shapes. An example of such a complex geometric shape is shown in FIG. 3. That shape is a "Queen Anne's" leg which will be understood may be manufactured either to the same scale as the master object or to a smaller scale. In some forms of the invention the geometric relationship between the pivot axis of the member 10, the master object 34 and the work piece 24 may be changed so that objects larger than the master object may be cut. It will also be understood that the apparatus is simple and inexpensive and may be easily added to existing commercial apparatus or alternatively may be sold together with that apparatus to enhance the desirability of owning such apparatus.

Having thus described my invention I claim:

1. An apparatus for duplicating a master object which comprises:

a frame, a first means cooperating with said frame for holding an associated work piece and rotating the work piece about a first axis, second means cooperating with said frame for holding an associated master object and rotating the master object about a second axis, a pivoting member carried on said frame for pivotal motion about a third axis which is generally parallel to said first axis and said second axis, a follower carried on said pivoting member in spaced relationship from said third axis, said follower engaging the associated master object and pivoting said pivoting member responsive to the contours of said master object, a router carried on said pivoting member in spaced relationship from both said follower and said third axis, said router including a tool disposed for engagement with the associated work piece, means for mounting said follower to allow translating motion along a path which is generally parallel to said first axis, means for varying the distance between said second axis and said path, and means for rotating the master object and the work piece.

2. The apparatus as described in claim 1 wherein said means for varying the distance between said path and said second axis comprises a pair of elongated slots in said frame.

3. The apparatus as described in claim 2 wherein said means for rotating the master object includes an elastic belt.

* * * * *